July 6, 1937.  A. B. WINCHELL  2,086,252
WINDSHIELD CLEANER MOTOR
Filed May 5, 1936  3 Sheets-Sheet 1
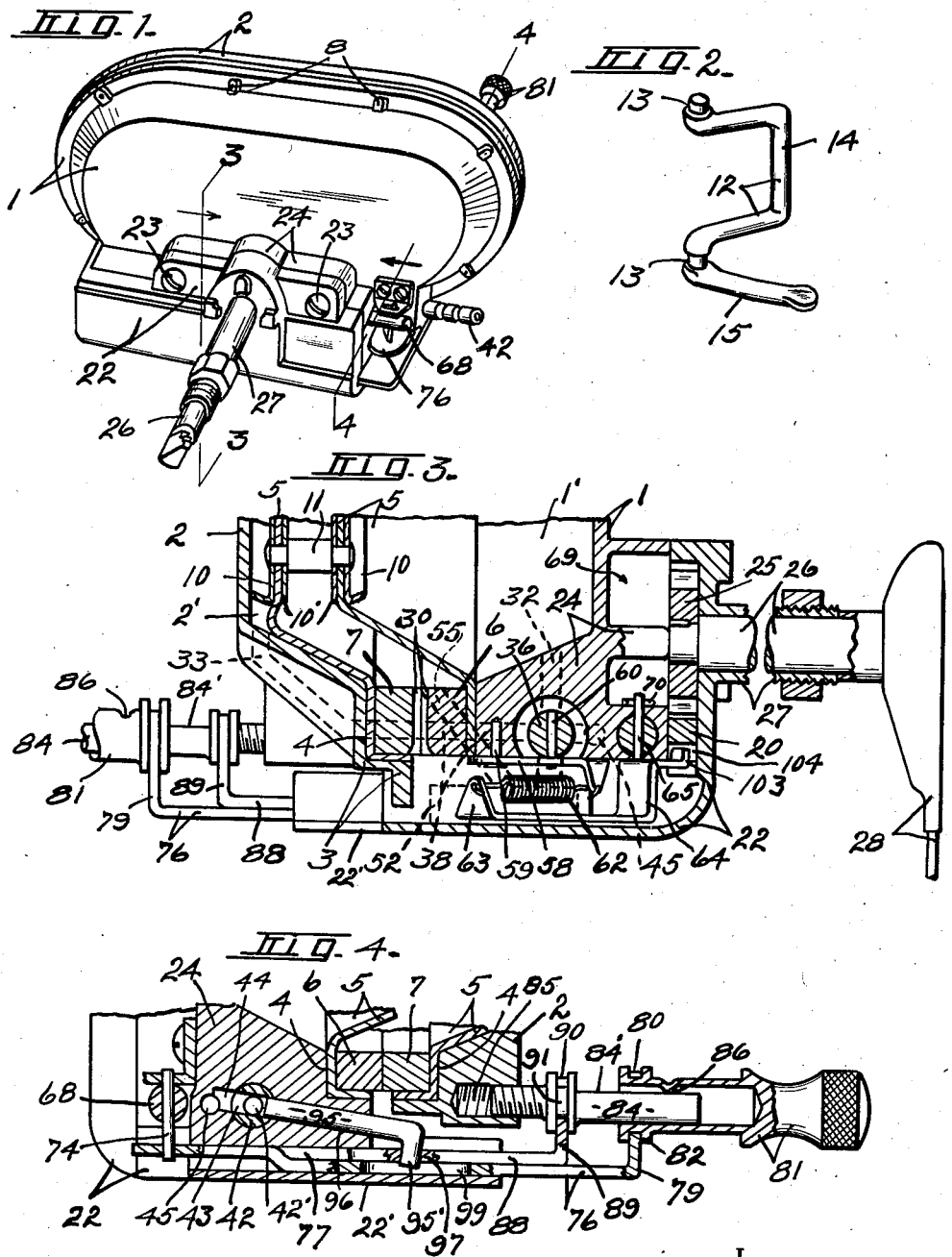

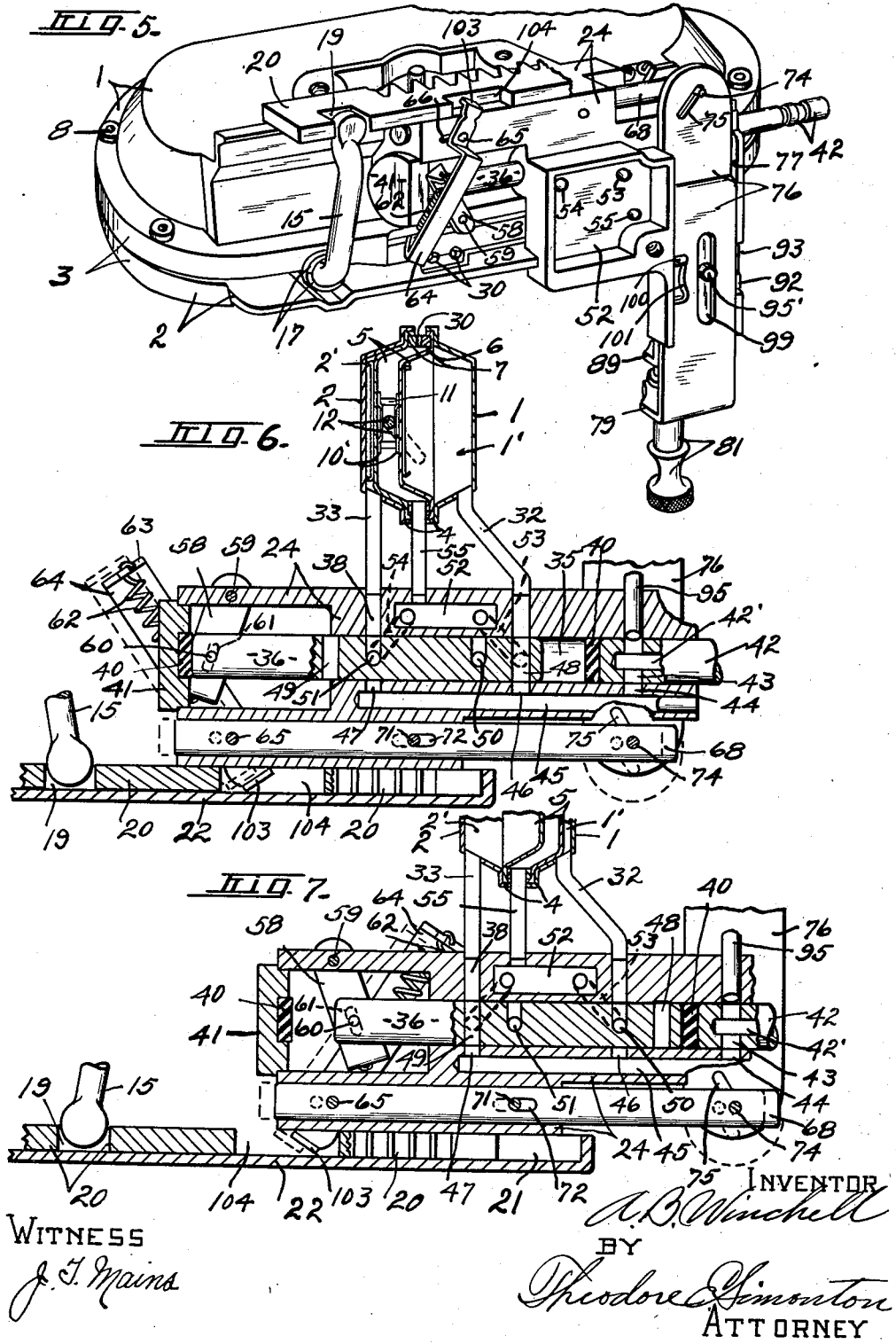

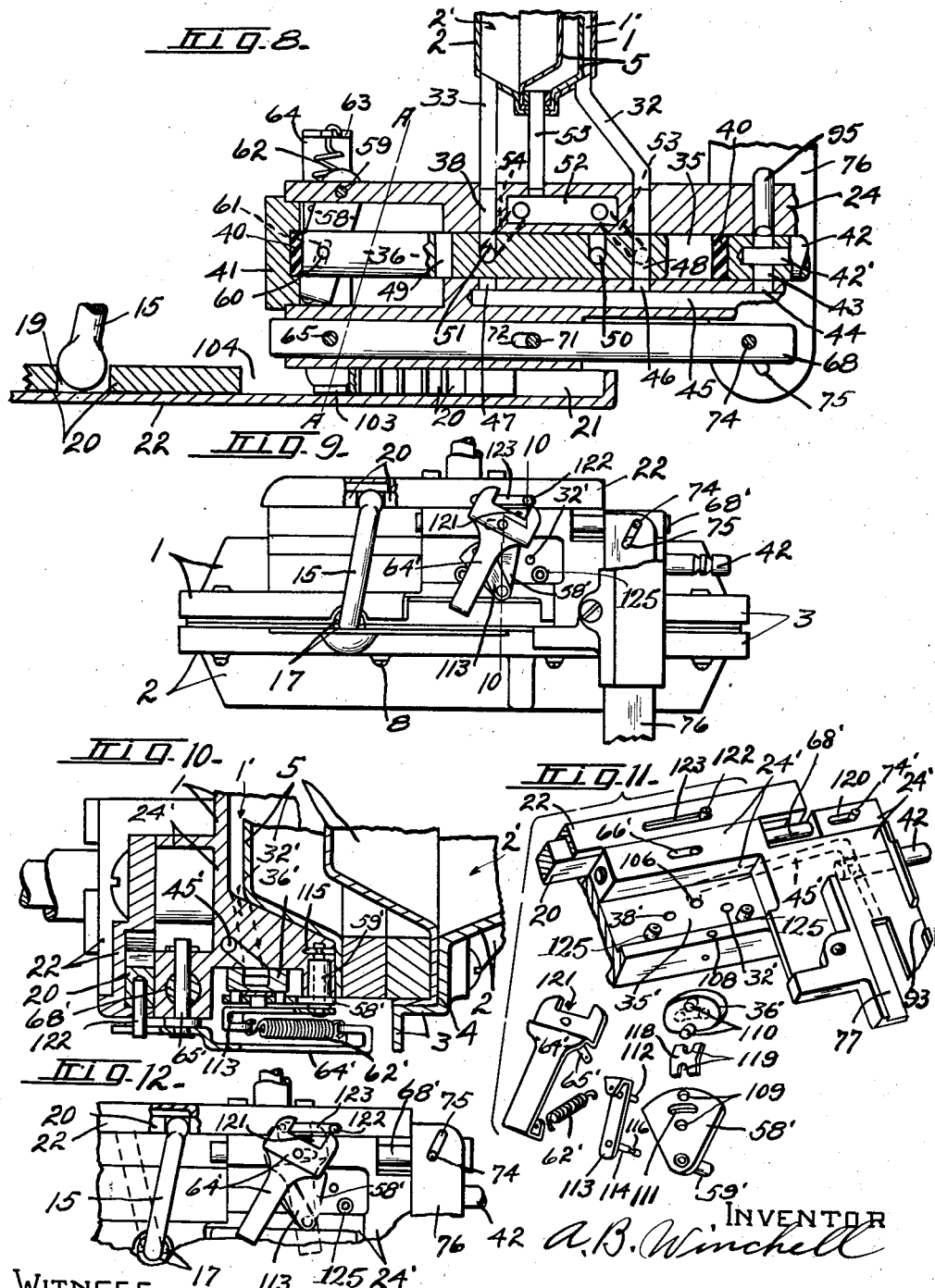

Patented July 6, 1937

2,086,252

UNITED STATES PATENT OFFICE 2,086,252

WINDSHIELD CLEANER MOTOR

Arthur B. Winchell, Jackson, Mich., assignor to The Sparks-Withington Company, Jackson, Mich., a corporation of Ohio Application May 5, 1936, Serial No. 77,973

24 Claims. (Cl. 121—48)

This invention relates to certain new and useful improvements in a windshield cleaner motor or the like, adapted to be operated by suction or differential fluid pressure. The invention pertains more particularly to a novel valve structure of the snap-over type for controlling the application of fluid pressure to the motor to effect movement of the wiper element back and forth across a surface of the windshield of a motor driven vehicle.

The main object of the invention is to provide an improved valve mechanism for automatically reversing the application of power to a fluid operated motor embodied in a windshield cleaner.

A further object resides in providing a valve mechanism of the type described with a simple control means for discontinuing the reversing action of the valve and causing the operating fluid to be continuously connected to one side of the windshield cleaner motor, whereby the motor and the associated wiper blade will be held parked at one end of the normal path of movement thereof.

A more specific object of the invention resides in providing a valve mechanism for a motor of the above mentioned class with a simple control means whereby the speed of operation and the starting and stopping of the operation of the motor may be governed independently of each other by one and the same control element.

Other objects and advantages pertaining to the structure of the device and to the form and relation of the parts thereof will more fully appear from the following description taken in connection with the accompanying drawings in which:

Figure 1 is a perspective view of a windshield cleaner motor embodying the various features of this invention.

Figure 2 is a perspective view of a crank shaft employed in the motor shown in Figure 1.

Figure 3 is an enlarged detail transverse sectional view through the lower portion of the motor taken substantially in the plane of the line 3—3, Figure 1.

Figure 4 is an enlarged detail transverse sectional view through a portion of my novel control mechanism taken substantially on line 4—4, Figure 1.

Figure 5 is a fragmentary perspective view illustrating the lower side of the motor with the supporting bracket removed showing my novel valve mechanism associated therewith.

Figures 6, 7 and 8 are more or less diagrammatic views showing the motor and the automatic valve mechanism for controlling the action thereof and illustrating different positions of the valve members in the three figures.

Figure 9 is an inverted plan view of a windshield cleaner motor showing a modified valve construction.

Figure 10 is an enlarged detail transverse sectional view through the valve mechanism and adjacent portion of the motor taken substantially on line 10—10, Figure 9.

Figure 11 is a perspective view showing a portion of the valve housing illustrated in Figures 9 and 10 with the valve elements in disassembled relationship.

Figure 12 is a plan view similar to Figure 9 with portions of the motor broken away and in section illustrating certain of the valve operating elements in a second position from that shown in Figure 9.

The windshield cleaner motor illustrated in the drawings is constructed similarly to the motor set forth in the co-pending application of William Sparks et al., Serial No. 47,162, filed October 28, 1935. That is, the motor of the instant application comprises a pair of complemental diaphragm case members 1 and 2, preferably formed of die castings and which are substantially cup-shaped in cross section to provide respective fluid pressure chambers 1' and 2'. Each case member is provided with a marginal L-shaped flange portion 3 which provides a marginal channel 4. Secured to each diaphragm case 1 and 2 is a diaphragm 5 which, in this instance, is substantially cup-shaped in cross section to correspond to the cross sectional contour of the case member. Each diaphragm has the marginal edge thereof seated in the marginal channel 4 of a respective diaphragm case member and is supported therein by clamping rings 6 and 7. The case members 1 and 2 are arranged in opposed relation with the channels 4 facing each other. The rings 6 and 7, diaphragms 5 and the case members are secured together by clamping bolts or screws 8. The clamping rings 6 and 7 are substantially equal to or slightly greater in transverse section than the marginal channels 4 of the case members so that when the rings are secured to the case members in holding engagement with the diaphragms, they will project outwardly beyond the outer edge of the corresponding flanges 3 and maintain the case members in slightly spaced relation to each other.

The diaphragms 5 are preferably formed of rubberized fabric or other highly flexible material and each has the central portion thereof fixedly secured to the central portion of the other diaphragm by means of inner or outer plates 10 and 10', respectively, and a plurality of, in this instance four, shouldered studs 11, one of which is clearly shown in Figure 3. The outer or adjacent plates 10' are preferably composed of spring sheet metal and have the central portions thereof slightly bowed or curved outwardly toward each other. The plates yieldingly contact the crank shaft whereby said shaft may be rocked about its axis by the diaphragms without the shaft producing an appreciable endwise movement of the diaphragm and at the same time prevent lost motion between the crank shaft and the diaphragms.

The crank shaft 12 as illustrated more clearly in Figure 2 is provided with a pair of spaced bearing portions 13 arranged in co-axial relation with each other and a crank member 14 arranged in a plane intermediate the bearing members 13. A crank arm 15 is secured to or made integral with the crank shaft adjacent the outer end of one of the bearing members 13. The bearing portions 13 are journaled in corresponding bearing members 17 as indicated in Figure 5 mounted between adjacent sides of the clamping rings 6 and 7 intermediate the central portions and one of the ends thereof. The relation of the bearing members 17 to the outer or bearing plates 10' and diaphragms 5 is such that the crank portion 14 of the shaft is positioned substantially midway between the ends of the diaphragms and plates 10.

The crank arm 15 extends from the adjacent bearing members 17 laterally of the case 1 as shown in Figure 5 into a recess 19 provided in one side of a rack member 20 which is mounted for longitudinal reciprocative movement in a suitable groove or channel 21 provided in the inner face of a supporting bracket 22, see Figure 7. The bracket 22, in this instance, is an L-shaped member and is secured by screws 23 to the case member 1 or, more accurately, to the valve housing portion 24, which, in this instance, is cast integral with the case 1. The rack 20 is in meshing engagement with a pinion 25 secured to one end of a blade actuating shaft 26 as shown in Figure 3. The shaft 26 extends outwardly through the adjacent side wall of the bracket 22 and a cylindrical projection or sleeve 27 which is secured to or made integral with the bracket. The shaft 26 may be provided with any suitable means for connecting the outer or forward end thereof with a wiper blade carrying arm 28 which may be of any suitable construction.

The outer or adjacent sides of the diaphragms 5 are maintained under the constant influence of atmospheric pressure by means of one or more apertures or notches 30 formed in the adjacent surfaces of the clamping rings 6 and 7 as shown in Figures 3 and 5. The opposite or inner sides of the diaphragms, that is the sides of the diaphragms facing the respective case member to which they are secured, are alternately brought under the influence of a fluid operating pressure such as may be produced for instance, by a suction device and the atmosphere for producing lateral movement of the diaphragms in first one direction and then in the opposite direction from within one pressure or fluid chamber 1' or 2' into the other chamber.

For this latter purpose, the case members 1 and 2 shown in Figures 1 and 3 to 8 inclusive, are provided with fluid ports or passages 32 and 33 respectively. One of the ports or passages as 32 provided in the case 1 is in direct communication with a valve chamber 35 provided in the valve housing 24 which forms a seat for a longitudinally reciprocating valve 36. The other port or passage 33 is maintained in communication with the valve chamber 35 by means of a fuel passage-way 38 which, as shown by broken lines in Figure 3, extends from the passage 33 through the clamping rings 6 and 7, the adjacent portions of the diaphragms 5 and the valve housing 24, and communicates with the valve chamber longitudinally thereof from the passage 32.

The valve chamber 35 is circular in cross section and extends longitudinally through the housing 24 in parallel relation with the chamber 1'. The valve 36 in this instance, is a cylindrical member and has a close sliding fit in the chamber 35. This valve, as shown in Figures 5, 6, 7, and 8, extends outwardly at one end beyond the chamber 35 and has connected thereto my novel snap-over valve operating mechanism which will be presently described. The valve 36 reciprocates in the chamber 35 between a pair of buffer or stop disks 40 composed of rubber or the like and which are mounted one within the chamber 35 and the other one in a plug 41 secured in any suitable manner to the valve housing 24. The buffer 40 mounted in the chamber 35 is positioned at the inner end of an attachment nipple 42 mounted in the end of the chamber 35.

This nipple extends outwardly from the housing 24 for connection with a flexible tubing or the like, not shown, adapted to be connected with a suitable source of suction. The bore 42' of the attachment nipple is in communication with a diametrically disposed passage 43 formed in the nipple a short distance from the inner end thereof. The passage 43 is in communication with a port 44 provided in the housing 24 in communication with a suction passage-way 45 which extends through the housing 24 in parallel spaced relation with the valve chamber 35 as shown in Figures 6, 7, and 8. The suction passage 45 is connected by ports 46 and 47 with the valve chamber 35, in the transverse planes of the chambers passing through the connection of passages 32 and 38 with said chamber.

The ports 46 and 47 are adapted to be alternately connected with the passages 32 and 38 respectively by suction ports 48 and 49 formed in the valve 36 during the reciprocatory movement of said valve. These latter ports, as shown in Figures 6, 7, and 8, are spaced from each other axially of the valve 36 a greater distance than the spacing of ports 46 and 47 and passages 32 and 38. The valve 36 is also provided with a pair of intake ports or passages 50 and 51 arranged intermediate the suction ports 48 and 49. These ports 50 and 51 are adapted to alternately connect the passages 32 and 38 and therefore chambers 1' and 2' with an intake or atmospheric chamber 52 formed in the housing 24 by means of respective passages 53 and 54 formed in the housing 24 as indicated by broken lines in Figures 6, 7, and 8. The atmospheric chamber 52 is maintained in communication with the space between the diaphragms 5 by a passage-way 55 formed in the housing 24 and the adjacent diaphragm 5 and clamping ring 6, as indicated by broken lines in Figure 3.

The valve 36 is reciprocated in the chamber 35 by my novel snap-valve mechanism which, in this instance, comprises a valve shifting arm 58 pivotally connected at one end to the housing 24 at one side of the valve 36 by means of a pintle 59. The shifting member or arm 58 extends from the pintle 59 across the valve 36 in close relation therewith and is operatively connected with said valve by a pin 60 secured to the valve and which extends outwardly therefrom through an elongated slot 61 provided in the arm 58 intermediate the ends thereof. The inner or free end of arm 58 is bent to extend outwardly at substantially right angles to the remaining portion of the arm and is connected by means of a spring 62 with the free end 63 of a valve actuator arm 64.

The actuator arm 64 extends across the arm 58 and valve 36 and is provided with a pintle 65 adjacent the end opposite end 63 thereof. This pintle 65 extends laterally from the inner face of the arm 64 through an elongated slot 66 provided in the housing 24 at substantially the diametrically opposite side of valve 36 from pintle 59.

The pintle 65 also extends through a control rod 68 which is mounted for longitudinal reciprocative movement in the housing 24 at one side of the suction passage 45 and in parallel relation therewith and with the piston chamber 35. The pintle 65 has the inner end thereof extended through the slot 66 into a chamber 69 formed in the housing 24 adjacent the pinion 25 and is prevented from axial displacement by a cotter key 70 secured in the inner end of said pintle. The axial movement of rod 68 is limited by a stop pin 71 mounted in the housing 24 and which extends through an elongated slot 72 formed in the rod 68 intermediate the ends thereof, as shown in Figure 6. This pin 71 and slot 72 also co-act to maintain the rod against rotary movement in the housing 24.

One end of the rod 68 extends beyond the adjacent portion of the housing 24 as shown in Figure 5 and has secured thereto a pin 74 which extends outwardly from one side thereof through an elongated cam slot 75 formed in a slide plate 76 adjacent one end thereof. The plate 76 is mounted for longitudinal sliding movement in a recess 77 formed in the housing 24 transversely of the housing adjacent the end thereof containing the attachment nipple 42. The cam slot 75, as shown in Figure 5, extends transversely of the slide 76 at an angle to the longitudinal axis thereof and of the rod 68 so that as said slide is moved axially an axial movement of the rod 68 will be produced by the co-action between the slot 75 and pin 74. The slide 76 is maintained in the recess 77 by the side 22' of the supporting bracket 22 which is extended across the recess to form a cover plate therefor, see Figures 3 and 4.

In order that the slide 76 may be moved axially for actuating the rod 68, said slide is extended outwardly beyond the bracket 22 and housing 24 and has the outer end portion 79 extended upwardly at substantially right angles to the remaining portion thereof. The end portion 79 is provided with an inwardly extending U-shaped slot 80 for receiving therein the inner end of a control handle 81. The inner end of the control handle 81 is provided with an annular peripheral recess 82 for receiving the end portion 79 of slide 76 therein. The handle 81 is slidably mounted upon a control screw 84 which is screw threaded into a threaded aperture 85 provided in the valve housing 24 as shown in Figure 4. Handle 81 is secured to screw 84 to rotate therewith by means of a shoulder 86 which slidably contacts a flattened side 84' of screw 84.

Mounted upon the slide 76 and positioned within the recess 77 is a second slide member 88 which has the outer end portion 89 bent to extend upwardly at substantially right angles to the remaining portion thereof and provided with an inwardly extending U-shaped slot 90 adapted to receive therein an intermediate portion of screw 84 which, like handle 81, is provided with an annular groove 91 for the reception of the end portion 89 of said slide. The sliding movement of member 88 in recess 77 is limited by a stop shoulder 92 formed on a longitudinal edge of the member and which, as illustrated in Figure 5, is positioned in an elongated slot 93 formed in the wall of recess 77.

Slide 88 is for the purpose of operating a speed control valve 95 which, as shown in Figure 4, is slidably mounted in a suitable recess 96 extending inwardly from one side of valve housing 24 in alignment with passage-way 43. The outer end of valve 95 is provided with a lateral projection or shoulder 95' which is seated in an aperture 97 provided in slide 88. The projection is in alignment with a longitudinally extending aperture or slot 99 formed in slide 76 which permits the end 95' of the valve to extend beyond the slide 88 and thereby provide for the positive connection of the valve with the relatively thin slide 88. The length of valve 95 is such that when plate 88 is in its innermost position said valve will nearly close the suction passage 42' of nipple 42 for limiting communication between said passage 42' and suction passage 45. When the plate is in the outermost position, said valve terminates short of passage 42' so that said passage will be in full communication with the suction passage 45.

This movement of valve 95 is produced by reciprocation of the slide 88 which is effected by screw 84 as said screw is screw threaded into or out of the aperture 85 by turning of handle 81. The reciprocating movement of slide 76 is independent of the movement of slide 88, being produced by longitudinal movement of handle 81 upon the outer end of screw 84. In order that slide 76 may be releasably maintained in either of the two operative positions a spring pressed plunger 100 is operatively mounted in the housing 24 adjacent one side of recess 77 and is adapted to be received in a cam recess 101 formed in the adjacent longitudinal edge of slide 76 as illustrated in Figure 5.

The actuator 64 has the end thereof adjacent pintle 65 extending outwardly over the rack 20 and has the outer end portion thereof provided with a lateral projection or shoulder 103 which extends into an elongated recess 104 provided in rack 20 as shown in Figure 5. The relation of pintle 65 to pin 74 and cam slot 75 is such that when slide 76 is in its outermost position, pintle 65 will be maintained thereby in the transverse plane of valve 36 passing through pintle 59 for valve shifting member 58. Furthermore, the relation of recess 104 to shoulder 103 of the actuator 64 is such that when pintle 65 is in the transverse plane of valve 36 passing through pintle 59 the forward or free end of the actuator 64 will be rocked by rack 20 during the reciprocation thereof from a position at one side of the center plane of valve shifter 58 passing through pintle 59 to a position at the opposite side of said center line.

This oscillatory movement of actuator 64 produces an oscillating movement of valve shifter 58 through the medium of spring 62 with a snap action for effecting axial movement of valve 36 from a position in contact with one buffer 40 into contact with the other buffer 40. If, on the other hand, slide 76 is in its innermost position, rod 68 will be so positioned thereby that pintle 65 will be maintained at one side of the transverse plane of the valve 36 passing through pintle 59 so that the outer or free end of actuator 64 will not be moved by rack 20 from the corresponding side of said center plane of the valve operator 58 to the opposite side thereof. This results in valve 36 being maintained in one of its two operative positions so that the operation of the motor will be discontinued and the wiper blade connected therewith maintained at a predetermined position in its normal path of movement by the continued communication of one of the pressure chambers with the source of suction. This operation of my novel motor control mechanism will possibly be more readily understood by referring to Figures 6, 7, and 8 wherein Figures 6 and 7 illustrate respective positions of the control mechanism during the normal operation of the motor and Figure 8 illustrates the position of the mechanism when the motor is at rest or inoperative.

Let it be assumed that attachment nipple 42 is connected with a suitable source of suction and that the handle 81 has been moved to its outermost position so that the axis of oscillation of actuator 64 is in the transverse plane of valve 36 passing through axis of oscillation of the valve shifting member 58 as shown in Figures 5, 6, and 7. Now by first considering the mechanism as positioned in Figure 6, it will be noted that rack 20 is in its innermost or extreme right hand position and valve 36 has just been snapped to its outermost or extreme left hand position while diaphragms 5 are positioned within chamber 2' ready to commence movement toward chamber 1'. This movement of the diaphragms will be effected for the reason that chamber 1' is connected by port 48 in valve 36 with suction passage 45 which, in turn, is maintained in constant communication with the source of suction when the control valve 95 is in its outermost position. Furthermore, chamber 2' is connected by port 51 in valve 36 and passage 54 in housing 24 with the atmospheric chamber 52 which, it will be observed, is maintained in constant communication with the outside atmosphere by openings 39 and passage-way 55 associated with the diaphragm case members 1 and 2.

The atmospheric pressure thus admitted to chamber 2' effects movement of diaphragms 5 into chamber 1' which, in turn, produces outward movement of rack 20 through the medium of crank shaft 12 and crank arm 15. As the rack 20 approaches its outermost or extreme left hand position as shown in Figure 7, the outer or free end 63 of the actuator 64 will pass from one side of the center plane of the valve shifter 58 passing through pintle 59 and pin 60 as shown by full lines in Figure 6, to the opposite side of said center plane as shown by full lines in Figure 7 thereby producing oscillation of the valve shifting member 58 for effecting inward movement of valve 36.

As the valve 36 reaches its innermost or extreme right hand position as shown in Figure 7, chamber 1' will be cut off from communication with the suction passage 45 and connected by intake port 50 with passage 53 and atmospheric chamber 52. At the same time, chamber 2' will be cut off from atmospheric chamber 52 and connected by port 49 with the suction passage 45 and, therefore, chamber 2' will be connected with the source of suction. The difference in fluid pressures thus produced in chambers 1' and 2' effects movement of diaphragms 5 from chamber 1' into chamber 2'. This movement of the diaphragms will again cause the rack 20 to return from its outermost position as shown in Figure 7 to its innermost position as shown in Figure 6 which produces oscillation of valve actuator 64 from the position shown in full lines in Figure 7 to the position shown in full lines in Figure 6 and thereby effect movement of valve 36 from its left hand or innermost position as shown in Figure 7 to its right hand or outermost position as shown in Figure 6.

These cycles of operation of the diaphragms 5 and valve 36, together with the mechanism connected therewith, may continue as long as desired or until suction passage 45 is cut off from communication with the source of suction. The speed of operation of diaphragms 5 and rack 20 may, as will readily be understood, be governed by controlling the size of the fluid passage connecting the suction device with the suction passage 45 which, in this instance, is determined by the position of the inner end of valve 95 relative to the attachment nipple passage 42'.

When it is desired to stop the operation of the motor, the rod 68, which supports the pintle 65, is moved to alter the axis of oscillation of the actuator 64 relative to the rack 20 whereby the action of the rack upon the actuator will be insufficient to produce operation of the valve 36. This movement of the rod 68 may be accomplished by simply moving the slide 76 to its innermost position through the medium of handle 81. This inward movement of slide 76 will effect axial movement of rod 68 due to the cam action of slot 75 upon pin 74, that is, rod 68 will be moved from the position shown by full lines in Figures 6 and 7 to the position shown by broken lines in said figures. The pintle 65 will be thereby shifted from a position lying in the transverse plane of valve 36 passing through pintle 59 to a position at the left hand side thereof as indicated by broken lines in Figures 6 and 7.

It will now be observed that if rack 20 is in its innermost position and the valve actuator 64 is in its outermost or extreme left hand position as shown by full lines in Figure 6, when rod 68 is moved by plate 76, then the actuator 64 will be moved from the position shown in full lines in Figure 6 to the position shown by broken lines in said figure while valve 36 will remain in its outermost or extreme left hand position. As rack 20 is now moved to its outermost position by atmospheric pressure maintained by valve 36 in chamber 2', the distance the valve actuator 64 will be moved by said rack about its pivot 65 will be insufficient to move the outer or free end 63 of said actuator through the plane of valve shifting member 58 passing through pivots 59 and pin 61 as illustrated in Figure 8. Therefore, as the diaphragms 5 reach their innermost position in chamber 1', valve 36 will be maintained in its outermost or extreme left hand position, chamber 1' will be maintained thereby in constant communication with the source of suction, while chamber 2' will be maintained in constant communication with the atmospheric pressure. This results in stopping the operation of the motor and the maintaining of the wiper blade actuated thereby at one end of its path of movement by the differential pressure thus maintained in chambers 1' and 2'.

If, on the other hand, valve 36 is in its innermost or extreme left hand position as shown in Figure 7 when slide 76 is moved to its innermost position, the valve actuator 64 will be moved by the axial movement of rod 68 produced thereby from the position shown in full lines to the position shown by broken lines in Figure 7, while valve 36 will remain in its normal innermost position. As the diaphragms 5 are now moved from chamber 1' into chamber 2', the inward movement of rack 20 produced thereby will cause the valve actuator 64 to move about its axis 65 until the outer or free end 63 thereof passes through the plane of valve shifting member 58 passing through pivot 59 and pin 61. As the actuator thus passes said plane the spring 62 will function to snap the said actuator and valve shifting member to the position indicated by broken lines in Figure 6, while valve 36 will be moved from its innermost position to its outermost position. As valve 36 is thus shifted, the pressures in chambers 1' and 2' will be reversed and the diaphragms 5 will be caused to move into chamber 1' while the rack 20 and actuator 64 will be moved thereby to the position shown in Figure 8. The movement of actuator 64 thus produced is insufficient to effect movement of valve 36 to its innermost position with the result that the motor will cease to operate as hereinbefore described.

It will be seen, therefore, that irrespective of the position of the diaphragms 5, rack 20 and valve shifting members 64 and 58, when slide 76 is operated to effect stopping of the motor, said motor will continue to operate until both rack 20 and valve 36 have been moved to their outermost or extreme left hand positions before stopping its operation. Furthermore, it will be obvious that as the rack 20 is always maintained at the same position, when the motor ceases to operate the wiper blade actuated by said rack will also be maintained at the same position in its normal path of movement when the motor is not operating.

After the motor has thus been stopped, the same may be caused to resume operation by the operator merely pulling the handle 81 to effect outward movement of slide 76. As the slide is thus moved to its outermost position, rod 68 will be returned from the left hand position shown in Figure 8 to the right hand position shown by full lines in Figures 6 and 7.

This movement of the rod 68 will cause the valve actuator 64 to swing inwardly about the point of contact of end 63 thereof with rack 20 as a pivot to the position indicated by line A—A, Figure 8. End 63 of the actuator is thus caused to pass through the plane of the valve shifting member 58 which passes through pins 59 and 61 so as to cause the spring 62 to slip the valve 36 to its opposite or innermost position. In other words, the valve 36 will be moved from the position shown in Figure 8 to the position shown in Figure 7 so that the fluid pressures in chambers 1' and 2' will be reversed and the diaphragms 5 and the mechanism associated therewith will be actuated thereby. Valve 36 and diaphragms 5 will now function in the manner hereinbefore described to automatically move the wiper blade back and forth across the face of the windshield to effect cleaning thereof until the position of pintle 59 relative to the transverse plane of valve 36 passing through pintle 59 has again been changed.

It will now be evident that the slide 76 for effecting starting and stopping operation of the motor may be operated independently of the slide 88 which operates the valve 95 for controlling the speed of operation of the motor. In other words, after valve 95 has been adjusted relative to the attachment nipple opening 42' by a rotary movement of the handle 81 and screw 84 to obtain the desired speed of operation of the windshield cleaner motor, the starting and stopping of the operation of the motor may be controlled by a reciprocatory movement of handle 81 without altering the position of the speed control valve 95 and slide 88.

In the modified structure shown in Figures 9, 10, 11, and 12, the fuel control valve as 36' is of the oscillating type and moves back and forth on a substantially flat valve seat 35' for connecting a suction port 106 in communication with the suction passage 45' alternately with two passages 32' and 38' leading to the diaphragm chambers 1' and 2' respectively. The valve shifting member 58' in this instance, is provided with a hollow post 59' which is journaled in a suitable aperture 108 provided in the valve housing 24' at one side of the valve seat 35'. The valve shifting member 58' is provided with a pair of radially spaced apertures 109 adapted to receive corresponding studs 110 provided on valve 36' for moving said valve in unison with the shifting member.

The shifting member 58' is also provided with an arcuate slot 111 arranged concentric with the post 59' intermediate apertures 109 for loosely receiving therein an arm 112 which projects from one side of the kicker 113. The kicker 113 is provided with a pintle 114 which is rotatably mounted in the bore of post 59'. The pintle 114 is of greater length than the post 59' and is prevented from outward axial movement relative to the housing 24' by a pin 115 secured in said housing tangentially to the aperture 108 and which registers in a peripheral groove 116 formed adjacent the lower or free end of the pintle 114, as shown in Figures 10 and 11.

It will thus be seen that the valve shifting member 58' is also maintained against outward movement relative to valve 36' by the engagement of pin 115 with pintle 114 and in order that valve 36' will be yieldingly maintained in engagement with the valve seat 35', I have provided a spring member 118 which is mounted upon valve 36 between said valve and the shifting member 58'. Spring 118 is provided with apertures 119 in opposite sides thereof adapted to receive posts 110 therein for holding the spring in operative relation with the valve and shifting member 58'.

The kicker member 113 is operated by means of a valve actuator 64' which is operatively connected with the kicker by spring 62'. The spring has the ends thereof fastened respectively to the free ends of the actuator 64' and kicker 113 as indicated in Figures 10 and 11. The actuator 64', like actuator 64, is provided with a pintle 65' secured thereto adjacent one end and which is adapted to extend through an elongated slot 66' formed in the housing 24' and into a control rod 68' which is mounted for longitudinal reciprocative movement in the housing. This rod 68', like the rod 68, has one end thereof provided with a pin 74' which, in this instance, extends outwardly through an elongated slot 120 formed in the housing 24' and into the cam slot 75 provided in the slide 76 as shown in Figures 9 and 12. In this instance, the actuator 64' is provided with an elongated recess 121 formed in the end thereof adjacent the pintle 65'. This recess loosely receives therein a pin 122 secured to the rack 20 and which extends outwardly from one side of said rack through an elongated slot 123 formed in the supporting bracket 22, see Figures 9 and 10.

The relation of the slot 121 and pin 122 to each other and to pintle 65' when said pintle is maintained by rod 68' and slide 76 in the plane passing through aperture 108 and valve seat port 106 is such that when actuator 64' is operated by the rack 20, the valve shifting member 58' and valve 36' will be oscillated thereby for alternately connecting suction port 106 with passages 32' and 38' in the same manner in which actuator 64 is operated by rack 20 for operating the valve shifting member 58 and valve 36. It will now be observed that the arcuate slot 111 provides a play connection between kicker 113 and valve shifting member 58' which enables the kicker to have a free initial movement relative to said member which permits said kicker to be under the full influence of the energy stored in the spring 62' when effecting movement of member 58 and valve 36'. This play connection, therefore, eliminates an initial relatively slow or creeping movement of the valve which might otherwise occur as the end of actuator 64' connected with spring 62' is passing through the longitudinal center plane of kicker 113.

Also, it will be understood that when rod 68' is shifted by plate 76 to bring pintle 65' in a position at one side of said plane as shown in Figure 12, the movement of rack 20 from the innermost or extreme left hand position indicated by full lines in Figure 12 to the outermost or extreme left hand position as indicated by broken lines in said figure, will produce only a partial movement of actuator 64'. That is, the actuator will be moved by the rack to substantially the position indicated by broken lines in Figure 12 which is insufficient to swing the free end of the actuator through the central plane of kicker 113 passing through arm 112 and pintle 114. Valve 36' will, therefore, remain in position for maintaining passage 38' and fluid pressure chamber 2' in communication wth suction port 106 and passage 45'. Also, passage 32' will remain uncovered by valve 36' and the fluid pressure chamber 1' will, therefore be maintained in communication with the atmosphere.

It will thus be seen that the operation of slide 76 controls the starting and stopping of the operation of the motor when the valve structure shown in Figures 9 to 12 inclusive is utilized in the same manner as when the motor is provided with the valve structure shown in Figures 1 to 8 inclusive.

In the structure shown in Figures 9 to 12 inclusive, the valve 36' operates between a pair of limiting stops 125 secured to the housing 24', one at either side of the valve seat 35' for maintaining the ports of the valve in registration with the suction port 106 and in one or the other of ports 32' and 38'.

Although I have shown and described the preferred embodiments of my invention, I do not wish to be limited to the exact construction shown as various changes may readily be made therein without departing from the spirit of the invention set forth in the appended claims.

I claim:

1. In a motor having operating means actuated by differential fluid pressure and a valve movable back and forth between two operative positions for operatively admitting fluid pressure to effect operation of the operating means and a drive element connected with the operating means to be actuated through a definite cycle of operation, the combination of means for operating said valve comprising an actuator operatively connected with the drive element, means operatively connecting the actuator with the valve for operating said valve with a snap-action after a predetermined movement of the actuator, and manually controlled means for altering the position of the actuator and the drive element relative to each other whereby the movement of the actuator produced thereafter by the drive element will be insufficient to effect operation of the valve.

2. In a motor having operating means actuated by differential fluid pressure and a valve movable back and forth between two operative positions for operatively admitting fluid pressure to effect operation of the operating means and a drive element connected with the operating means to be actuated through a definite cycle of operation, the combination of cooperating elements for operating said valve comprising an actuator operatively connected with the drive element, means operatively connecting the actuator with the valve for operating said valve with a snap-action after a predetermined movement of the actuator, and manually controlled means for altering the position of at least one of the valve operating elements relative to the valve and to said drive element whereby the action of the drive element upon the actuator will be insufficient to produce operation of the valve.

3. A device as in claim 2 having a fluid pressure control valve and means operatively connecting the valve with the manually controlled means whereby the speed of operation of the motor may be governed.

4. In a motor having operating means actuated by differential fluid pressure and a valve movable back and forth between two operative positions for operatively admitting fluid pressure to effect operation of the operating means and a drive element connected with the operating means to be actuated thereby through a definite cycle of operation, the combination of means for operating said valve comprising an actuator, means operatively connecting the actuator with the valve for operating said valve with a snap action, separate means operatively connecting the actuator with the drive element whereby said actuator has a play connection with the element to effect operation of the valve at one position of the actuator, and means for altering the position of the actuator and drive element relative to each other whereby the action of the drive element upon the actuator will be insufficient to produce operation of the valve.

5. A device as in claim 4 wherein the means for altering the position of the actuator includes a manually operated unit and separate means actuated by said unit adapted to control the fluid pressure admitted to the operating means for controlling the speed of operation of the motor.

6. In a motor having operating means actuated by differential fluid pressure and a valve movable back and forth between two operative positions for operatively admitting fluid pressure to effect operation of the operating means and a drive element connected with the operating means to be actuated thereby through a definite cycle of operation, the combination of means for operating said valve comprising an oscillating actuator, means operatively connecting the actuator with the valve for operating said valve with a snap action, separate means operatively connecting the actuator with the drive element whereby said actuator has a play connection with the element to effect operation of the valve at one position of the actuator, and means including a movable supporting member for the actuator for altering the axis of oscillation of the actuator relative to the drive element whereby the action of the drive element upon the actuator will be insufficient to produce operation of the valve.

7. A device as in claim 6 wherein the means for altering the axis of oscillation of the actuator includes a manually operated unit, and separate means actuated by said unit adapted to control the fluid pressure admitted to the operating means for controlling the speed of operation of the motor.

8. A valve mechanism for a fluid motor comprising a valve movable back and forth between two operative positions for operatively admitting fluid pressure to the motor to effect operation of parts of said motor, means for operating said valve including a valve operating member operatively connected with the valve and mounted to oscillate about a predetermined axis, an actuator operatively connected with the operating member for effecting oscillation thereof mounted to oscillate about a second predetermined axis, and means for altering the position of one of said axes relative to the other axis to control the operation of the valve to start and stop the operation of the motor.

9. A valve mechanism for a motor having case means and fluid pressure operated elements associated with the case means to form separate fluid pressure chambers, fluid conveying means connected with the pressure chambers and including a valve movable back and forth between two operative positions for operatively connecting the pressure chambers to a source of fluid operating pressure, a valve operating member pivotally connected with the case, an actuator member for the operating member connected with the pressure operated elements to be actuated thereby back and forth between two positions, spring means operatively connecting the actuator with the operating member and functioning to move the valve operating member with a snap action after a predetermined initial movement of the actuator, and manually operated means for shifting one of said members relative to the other member whereby the operation of the valve may be controlled to start and stop the operation of the motor.

10. A valve mechanism for a motor having case means and fluid pressure operated elements associated with the case means to form separate fluid pressure chambers, fluid conveying means connected with the pressure chambers and including a valve movable back and forth between two operative positions for operatively connecting the pressure chambers to a source of fluid operating pressure, a valve operating member pivotally connected with the case, an actuator member for the operating member pivotally connected to the case, means operatively connecting the actuator member with the pressure operated elements for effecting oscillation of said actuator member, means including a resilient element associated with the members for moving the valve operating member after a predetermined movement of said resilient element by the actuator member, and manually operated means connected with the case means and pivotally supporting one of said members for altering the axis of oscillation thereof relative to the axis of oscillation of the other member whereby the operation of the valve may be controlled to start and stop the operation of the motor.

11. A valve mechanism for a fluid motor having case means and fluid pressure operated elements associated with the case means to form separate fluid pressure chambers, fluid conveying means connected with the pressure chambers and including a valve movable back and forth between two operative positions for operatively connecting the pressure chambers to a source of fluid pressure, a valve actuator member, means operatively connecting the actuator member with the pressure operated elements for moving said actuator back and forth between two positions, means operatively connecting the actuator member with the valve including a resilient element for moving said valve after a predetermined movement of the resilient element by the actuator member, means slidably connected with the case means pivotally supporting the actuator member and functioning to maintain the axis of oscillation thereof at a predetermined position for operating the valve, and manually controlled means operatively connected with the supporting means for altering the axis of rotation of the actuator whereby the operation of the valve may be automatically controlled to start and stop the operation of the motor.

12. A valve mechanism for a fluid motor having case means and fluid pressure operated elements associated with the case means to form separate fluid pressure chambers, fluid conveying means connected with the pressure chambers and including a valve seat, a valve thereon movable back and forth between two positions, a valve operating member pivotally mounted on the case to oscillate about a fixed axis, a valve actuator member, means including a spring operatively connecting the actuator with the operating member and functioning to move the valve operating member with a snap action after a predetermined initial movement of the actuator, operating means including a reciprocating member connected with the pressure operated elements to be actuated thereby, means operatively connecting the reciprocating member with the actuator for producing movement of said actuator after a predetermined movement of the reciprocating means, supporting means movably connected with the case means for pivotally supporting the actuator, and manually operated means connected with the supporting means for altering the axis of oscillation of the actuator member.

13. A valve mechanism for a fluid motor having case means and fluid pressure operated elements associated with the case means to form separate fluid pressure chambers, fluid conveying means connected with the pressure chambers and including a valve seat, a valve thereon movable back and forth between two positions, a valve operating member pivotally mounted on the case to oscillate about a fixed axis, a kicker having a play connection with the operating member for operating said operating member, an actuator member, means resiliently connecting the actuator member with the kicker acting to accelerate the movement of the kicker after a predetermined initial movement of the actuator member, operating means including a reciprocating member connected with the pressure operated elements to be actuated thereby, means operatively connecting the reciprocating member with the actuator for producing movement of said actuator after a predetermined movement of the reciprocating means, supporting means movably connected with the case means for pivotally supporting the actuator, and manually operated means connected with the supporting means for altering the axis of oscillation of the actuator member.

14. A windshield cleaner motor having a pair of flexible diaphragms, supporting means for the diaphragms including a pair of complemental case sections fixedly connected to the diaphragms and to each other with the diaphragms arranged adjacent each other to form a pair of spaced fluid pressure chambers, a pair of fluid passages associated with the case, each passage leading to a respective one of said pressure chambers, a valve movable back and forth between two operative positions for operatively connecting the passages with a source of fluid pressure, means for operating said valve comprising a pair of relatively movable members operatively connected respectively with the valve and with said diaphragms, means operatively connecting said members to each other and functioning to move the member connected to the valve with a snap action after a predetermined initial movement of the other member, and manually operated means for shifting one of said members relative to the other member whereby the operation of the valve may be controlled to start and stop the operation of the motor.

15. A device as in claim 14 wherein the manually operated means includes a handle and separate valve means actuated by said handle independently of the shifting means for controlling the speed of operation of the motor.

16. A windshield cleaner motor having a pair of flexible diaphragms, supporting means for the diaphragms including a pair of complemental case sections fixedly connected to the diaphragms and to each other with the diaphragms arranged adjacent each other to form a pair of spaced fluid pressure chambers, a pair of fluid passages associated with the case, each passage leading to a respective one of said pressure chambers, a valve movable back and forth between two operative positions for operatively connecting the passages with a source of fluid pressure, a valve housing connected with the case sections for supporting said valve, means for operating said valve comprising a valve operating means pivotally connected with the housing to oscillate about a fixed axis, an actuator member, spring means connecting the actuator with the valve operating member, means slidably connected with the housing pivotally supporting the actuator, manually controlled means connected with the supporting means for actuating said supporting means to vary the axis of oscillation of the actuator member relative to the axis of oscillation of the valve operating member, and means operatively connecting the actuator member with the diaphragms.

17. A windshield cleaner motor having a pair of flexible diaphragms, supporting means for the diaphragms including a pair of complemental case sections fixedly connected to the diaphragms and to each other with the diaphragms arranged adjacent each other to form a pair of spaced fluid pressure chambers, a valve housing connected with the case sections provided with a pair of fluid passages and a suction port, each of said passages leading to a respective one of said pressure chambers, a valve movable back and forth between two positions on said seat for operatively connecting the passages with the suction port, an operating member pivotally connected with the housing to oscillate about a fixed axis for operating said valve, a kicker mounted coaxially with the operating member and having a play connection therewith permitting independent movement of the kicker, an actuator member, spring means connecting the actuator and the kicker, means slidably connected with the housing for pivotally supporting the actuator member in predetermined relation with the axis of movement of the kicker, manually operated means for actuating said supporting means to vary the relation of the axis of oscillation of the actuator relative to the axis of operation of the kicker, and means operatively connecting the actuator with the diaphragms.

18. In a motor having operating means actuated by fluid pressure and a valve movable back and forth between two operative positions for operatively admitting fluid pressure to exert operation of the operating means and a drive element connected with the operating means to be actuated thereby through a definite cycle of operation, the combination of means for operating said valve comprising a pair of relative movable members operatively connected respectively with the valve and with said drive element, means operatively connecting said members to each other and functioning to move the member connected with the valve only after a predetermined initial movement of the other member, and manually operated means for shifting one of said members relative to the other member and to said drive element and valve whereby the operation of the drive element upon said members is insufficient to produce operation of the valve.

19. In a motor having operating means actuated by fluid pressure and a valve movable back and forth between two operative positions for operatively admitting fluid pressure to effect operation of the operating means and a drive element connected with the operating means to be reciprocated thereby through a definite cycle of operation, the combination of means for operating said valve comprising a valve actuator member operatively connected with the drive element to be moved by said element through a predetermined path of operation, means operatively connecting the actuator member with the valve and functioning to move the valve with a snap-action after a predetermined initial movement of the actuator, and manually operated control means operatively connected with the actuator member for shifting said member in the direction of one of the reciprocative movements of the drive element to alter the path of movement of said actuator produced by said element whereby the action of the drive element upon the actuator will be insufficient to produce operation of the valve when the drive element is operating in one of said directions only.

20. In a motor having operating means actuated by fluid pressure and a valve movable back and forth between two operative positions for operatively admitting fluid pressure to effect operation of the operating means and a drive element connected with the operating means to be actuated thereby through a definite cycle of operation, the combination of means for operating said valve comprising an actuator member, means operatively connecting the actuator member with the drive element whereby the actuator will be moved thereby back and forth through a predetermined path of movement, means controlled by said actuator member for producing movement of the valve during portions only of each cycle of movement of the drive element, and manually operated control means operatively connected with the actuator member for shifting said member relative to the drive element to effect a decrease in said path of movement whereby the action of the drive element upon the actuator member during at least one of said portions of the cycle of operation thereof will be insufficient to produce operation of the valve.

21. In a fluid pressure operated motor for windshield cleaners or the like, in combination, a pair of flexible diaphragms, supporting means for the diaphragms including a pair of complemental case sections, means securing the case sections and diaphragms together with said diaphragms arranged adjacent each other intermediate said case sections to form a pair of spaced fluid pressure chambers, a rock shaft and a drive shaft journaled in the supporting means, means connected to the diaphragms at the adjacent sides thereof operatively connecting said diaphragms to the rock shaft at one side of the axis of rotation of said shaft, transmission means mounted exteriorly of the pressure chambers and including a rack and pinion operatively connecting the rock shaft with the drive shaft for producing oscillation of said latter shaft, and fluid conveying means associated with the supporting means exteriorly of the pressure chambers for alternately connecting said pressure chambers with a source of fluid operating pressure and with an exhaust for said operating pressure including a valve movable back and forth between two operative positions, and means including cooperating drive and driven elements connected with the rack and with said valve having a lost motion therebetween during a portion only of a cycle of operation of said drive element for operatively connecting the valve with said rack to intermittently actuate said valve.

22. In a fluid pressure operated motor for windshield cleaners or the like, in combination, a pair of flexible diaphragms, supporting means for the diaphragms including a pair of complemental case sections, means securing the case sections and diaphragms together with said diaphragms arranged adjacent each other intermediate said case sections to form a pair of spaced fluid pressure chambers, a rock shaft and a drive shaft journaled in the supporting means, means connected to the diaphragms at the adjacent sides thereof operatively connecting said diaphragms to the rock shaft at one side of the axis of rotation of said shaft, transmission means mounted exteriorly of the pressure chambers and including a rack and pinion operatively connecting the rock shaft with the drive shaft for producing oscillation of said latter shaft, and fluid conveying means associated with the supporting means exteriorly of the pressure chambers for alternately connecting said pressure chambers with a source of fluid operating pressure and with an exhaust for said operating pressure including a valve movable back and forth between two operative positions, an actuator pivotally connected with the support, means operatively connecting the actuator with the valve to effect movement of the valve with a snap action after a predetermined initial movement of the actuator, and means operatively connecting the actuator with the rack to intermittently actuate said valve.

23. In a fluid pressure operated motor for windshield cleaners or the like, in combination, a pair of flexible diaphragms, supporting means for the diaphragms including a pair of complemental case sections, means securing the case sections and diaphragms together with said diaphragms arranged adjacent each other intermediate said case sections to form a pair of spaced fluid pressure chambers, a rock shaft and a drive shaft journaled in the supporting means, means connected to the diaphragms at the adjacent sides thereof operatively connecting said diaphragms to the rock shaft at one side of the axis of rotation of said shaft, transmission means mounted exteriorly of the pressure chambers and including a rack and pinion operatively connecting the rock shaft with the drive shaft for producing oscillation of said latter shaft, and fluid conveying means associated with the supporting means exteriorly of the pressure chambers for alternately connecting said pressure chambers with a source of fluid operating pressure and with an exhaust for said operating pressure including a valve movable back and forth between two operative positions, an actuator, means pivotally connecting the actuator to the supporting means, means operatively connecting the actuator with the valve to effect movement of the valve after a predetermined initial pivotal movement of the actuator, means including cooperative drive and driven elements connected with the rack and with the actuator having a lost motion therebetween during a portion only of the cycle of movement of the rack for operatively connecting the actuator with the rack, and manually operated means connected with the pivotal means for shifting the actuator relative to the rack whereby the action of the rack upon the actuator will be insufficient to effect operation of the valve.

24. A fluid pressure motor for operating a windshield cleaner element or the like comprising fluid pressure chambers, operating means associated with said chambers adapted to be operated by fluid pressure for actuating said cleaner element, means including a valve movable back and forth between two operative positions for alternately connecting said pressure chambers with a source of fluid operating pressure and with an exhaust for said pressure, means including drive and driven elements connected with the operating means and with said valve respectively and having a lost motion therebetween during a portion only of the cycle of movement of the drive element for intermittently operating the valve, and manually operated control means connected with one of said elements for shifting the operative position thereof relative to the other element whereby the action of the operating means upon the valve will be insufficient to effect movement of said valve.

ARTHUR B. WINCHELL.